United States Patent [19]

Perilloux et al.

[11] Patent Number: 4,746,202
[45] Date of Patent: May 24, 1988

[54] POLARIZATION PRESERVING REFLECTOR AND METHOD

[75] Inventors: Bruce E. Perilloux; Dennis G. Fischer, both of Auburn, Calif.

[73] Assignee: Coherent, Inc., Palo Alto, Calif.

[21] Appl. No.: 107,906

[22] Filed: Oct. 15, 1987

Related U.S. Application Data

[63] Continuation of Ser. No. 754,023, Jul. 11, 1985, abandoned.

[51] Int. Cl.$^4$ .............. G02B 27/28; G02B 1/10; B23K 9/00
[52] U.S. Cl. .................. 350/394; 219/121 LQ; 350/164
[58] Field of Search .................. 350/1.7, 164, 394–395, 350/642; 219/121 LQ, 121 LR

[56] References Cited

U.S. PATENT DOCUMENTS

| | | | |
|---|---|---|---|
| 4,099,853 | 7/1978 | Glickler et al. | 350/610 |
| 4,312,570 | 1/1982 | Southwell | 350/394 |
| 4,322,130 | 3/1982 | Ito et al. | 350/642 |
| 4,336,439 | 6/1982 | Sasnett et al. | 219/121 LH |
| 4,379,622 | 10/1980 | Fischer et al. | 350/394 |
| 4,536,063 | 8/1985 | Southwell | 350/395 |
| 4,662,722 | 5/1987 | Buczek | 350/395 |

OTHER PUBLICATIONS

Welch, M., "Concepts of Polarization Physics", Lasers & Applications", 1-1986, pp. 67–71.

Southwell, W. H., "Multilayer Coatings Producing 90° Phase Change", App. Optics vol. 18, 6-1-79, p. 1875.

Dobrowolski, J. A., "Completely Automatic Synthesis of Optical Thin Film Systems", App. Optics vol. 4, 8-1965, pp. 937–946.

Southwell, W. H., "Multilayer Coating Design Achieving a Broad Band 90° Phase Shift", App. Optics vol. 19, 8-15-80, pp. 2688–2692.

Varo, "Reflective Optics by the Replica Process", Advertisement from Varo Inc., Garland, Texas, 1963.

Single-Reflection Film-Substrate Half-Wave Retarders with Nearly Stationary Reflection Properties Over a Wide Range of Incidence Angles, J. Opt. Soc. AM/vol. 73, No. 2/Feb. 1983 (R. M. A. Azzam & M. Emdadur Rahman Khan).

Primary Examiner—William H. Punter
Attorney, Agent, or Firm—Limbach, Limbach & Sutton

[57] ABSTRACT

A polarization preserving reflector for reflecting an incident beam of monochromatic radiation, said beam having a polarization configuration and an angle of incidence. The polarization preserving reflector comprises a substrate; a highly reflective layer positioned adjacent to said substrate; and at least two thin film optical layers one of which being positioned adjacent to the highly reflective layer, one of the thin film optical layers having a high refractive index and another having a low refractive index, for maintaining the incident polarization configuration while producing a high reflectance upon reflection of the beam therefrom in a wide range of the angle of incidence from approximately zero degrees to 75 degrees.

13 Claims, 6 Drawing Sheets

POLARIZATION PRESERVING REFLECTOR AND METHOD

This is a continuation of co-pending application Ser. No. 754,023 filed on July 11, 1985, and now abanonded.

TECHNICAL FIELD

This invention relates to laser systems, and more particularly, to a polarization preserving reflector.

BACKGROUND ART

Figures 1A, 2A, 3:
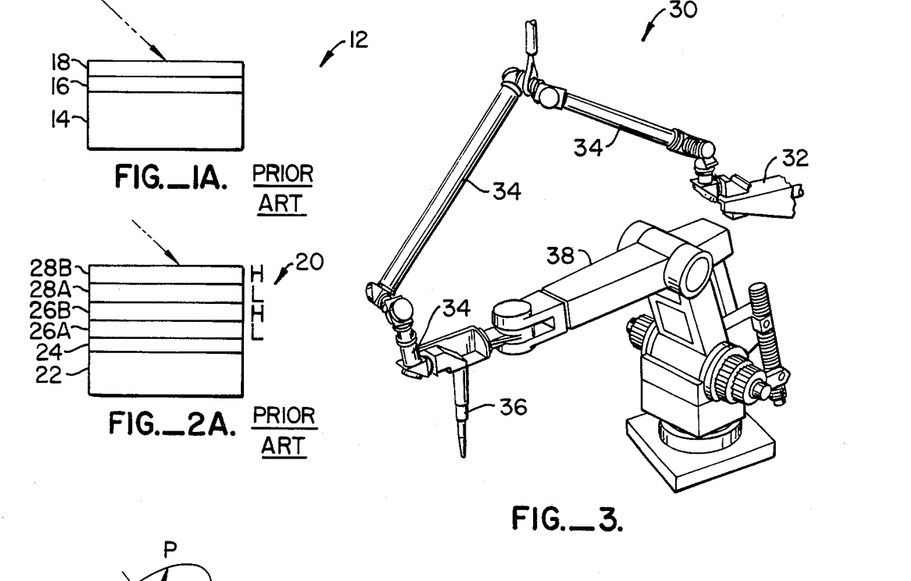
FIG. 1A is a simplified, diagrammatical view of a prior art optical thin film reflector.
FIG. 2A is a simplified, diagrammatical view of another prior art optical thin film reflector.
FIG. 3 is a simplified, perspective view of a laser delivery system.

Laser systems in the art invariably utilize reflectors to control the direction and some of the polarization properties of a usually monochromatic radiation emitted from a laser source. Reflectors, therefore, are known in the art. One of such prior art reflectors is shown in FIG. 1A. That reflector has thin film optical coatings on it for improving the reflectance and/or polarization of an incident light beam. In addition, that reflector is designed for use with a beam of specific wavelength. More particularly, that reflector comprises a substrate onto which a highly reflective metallic layer such as silver or aluminum is deposited. A thin film optical coating is generally deposited atop the metallic layer to protect the reflector from environmental hazards such as humidity, scratches, etc. The use of this thin transparent dielectric film contributes to the nomennclature "protected silver reflector."

The protected silver reflector has an inherent characteristic, i.e., the relative or differential phase between the "p" and "s" linear polarizations of an incident beam is shifted four to six degrees during each reflection. Such phase shift or retardation is generally acceptable when generally three or less reflections are required in such a laser system. Where several reflectors are required in a system, however, the polarization of the beam is so significantly altered that the resultant beam is undesirable. An example of such a multi-reflection laser delivery system is shown in FIG. 3, in which eight reflectors are employed. If the work to be performed by the laser system of FIG. 3 is to cut or machine a thick piece of metal into a configuration, and especially when either the workpiece or the laser delivery arm needs to be maneuvered, the quality of the cut will be different at different locations of the cut since the cut is dependent on the polarization of the laser beam. This is a well recognized phenomenon of laser cutting.

In order to enhance the reflectance or percent of light reflected off a protected silver reflector such as the one shown in FIG. 1A, another prior art reflector such as the one illustrated in FIG. 2A is used. The reflector in FIG. 2A also comprises a substrate onto which a highly reflective metal is deposited. Instead of just one dielectric layer, several alternating layers of dielectric thin films are deposited; the material of one type of the dielectric thin films is a high optical refractive index material such as Ge or $TiO_2$, and the other type being a low optical refractive index material such as $SiO_2$, ZnS or $ThF_4$. Each of these thin film layers has an optical thickness of one quarter wave of the wavelength of the laser light, contributing to the nomenclature "quarter wave stack." This type of reflector is also generally referred to as an "enhanced silver reflector," and an example of which is disclosed in Fischer et al., U.S. Pat. No. 4,379,622. Enhanced silver reflectors are designed to give a reflectance higher than that of the protected silver design by using quarter waves of alternating low and high refractive index materials. In addition, enhanced silver reflectors are also capable of preserving incident polarization if the angle of incidence of the light beam is less than approximately 40 degrees. This feature, however, was neither recognized nor sought by those skilled in the art. Moreover, if the thicknesses of the layers are not correctly tuned, i.e., tuned to the center wavelength of the beam, then an arbitrary differential phase shift will occur. This infirmity is similar to that of the protected silver reflectors.

Reflectors in the present art, when used in systems such as the one illustrated in FIG. 3, are positioned such that the angle of incidence of the laser beam is at 45 degrees. Although constraining the angle of incidence of all the reflectors to 45 degrees eliminates mechanical problems of beam alignment, it increases the number of reflectors required and the power loss in the laser delivery system. Such a constraint is, therefore, undesirable.

DISCLOSURE OF THE INVENTION

It is a major object of the present invention to provide a polarization preserving reflector that is capable of preserving the polarization of any incident beam.

It is another object of the present invention to provide a polarization preserving reflector that is insensitive to the angle of incidence of a monochromatic light source.

It is a further object of the present invention to provide a polarization preserving reflector that is capable of focusing or collimating a laser beam.

In order to accomplish the above and still further objects, the present invention provides a polarization preserving reflector for reflecting an incident beam of monochromatic radiation, said beam having a polarization configuration and an angle of incidence. The polarization preserving reflector comprises a substrate; a highly reflective layer positioned adjacent to said substrate; and at least two thin film optical layers one of which being positioned adjacent to the highly reflective layer, one of the thin film optical layers having a high refractive index and another having a low refractive index, for maintaining the incident polarization configuration while producing a high reflectance upon reflection of the beam therefrom in a wide range of the angle of incidence from approximately 40 degrees to 75 degrees.

Other objects, features, and advantages of the present invention will appear from the following detailed description of the best mode of a preferred embodiment, taken together with the accompanying drawings.

BEST MODE FOR CARRYING OUT THE INVENTION

As shown in FIG. 1A, there is illustrated a prior art reflector, designated 12. Reflector 12 comprises a substrate 14 onto which a highly reflective layer 16 is deposited. Reflective layer 16 is generally a metallic material such as silver, gold or aluminum. A protective layer 18 is deposited atop reflective layer 16 to protect layer 16 from environmental damages such as humidity or scratches. Protective layer 18, generally a transparent dielectric material, has an optical thickness of approximately 0.8 of one quarter wave. Reflector 12 is generally capable of providing a reflection of approximately 98.5% at the conventional angle of 45 degrees.

Figure 1B:
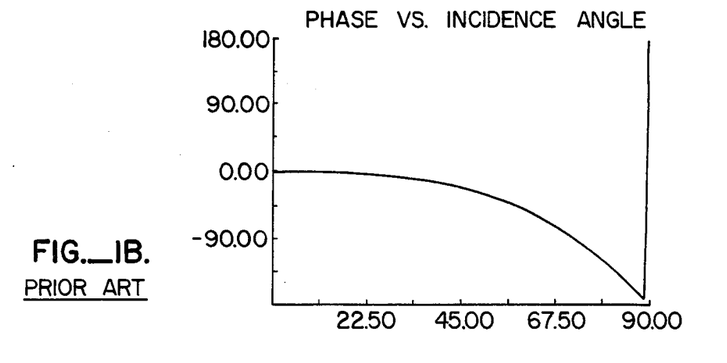
FIG. 1B is a graph illustrating the phase shift aspect of the reflector of FIG. 1A.

Reflector 12 however, has an inherent disadvantage, that is, it has the inherent characteristic of a differential or relative phase between the incident, linear and orthogonal "p" and "s" polarizations of a laser beam upon reflection. If, for example, the incoming laser beam is collimated, monochromatic and circularly polarized, i.e., the differential phase shift between the "p" and "s" linear polarizations is 90 degrees, reflector 12, positioned at a 45-degree angle of incidence, reduces the differential phase by four to six degrees upon reflection. Such an alteration of the differential phase shift causes the reflected beam to become an arbitrarily elliptically polarized, rather than circularly polarized, beam. As shown in FIG. 1B, reflector 12 causes a differential phase shift upon reflection of −45 and −90 degrees for incidence angles of 56 and 70 degrees, respectively.

When several reflectors 12 are employed in a system such as the laser system illustrated in FIG. 3, deviation of the polarization from circular is severe enough such that the resultant beam is undesirable. The system in FIG. 3, designated 30, includes a laser source 32, a plurality of tubular arms 34, and a focusing device 36. System 30 utilizes a plurality of reflectors 12 which are generally positioned at the junctures between tubular arms 34, and the juncture between one of the arms 34 and focusing device 36. The use and position of reflectors 12 are well within the knowledge of one skilled in the art.

In use, system 30 includes a robotic delivery arm system 38 that is adapted to position focusing device 36 over a workpiece, not shown. When robotic system 38 positions focusing device 36 so as to cut or machine the workpiece, e.g., to drill a hole or to cut a line, the ellipticity of the emerging beam from focusing device 36 is greater than desired. Since the ellipticity required for the best cut is unity, i.e., one, beams having polarizations which diverge from circular will increase from unity which means a more elliptical polarization. When the ellipticity is greater than an acceptable value of 1.15, the quality of the cut deteriorates such that if system 30 were used to drill a hole, the shape of the hole would be elliptical rather than circular; or, if it were cutting a circle, the depth of cut and the width of the cut would vary around the circle. Thus, the quality of the cut produced by system 30 that employs reflectors 12 is undesirable. To remedy disadvantages such as inconsistency of the depth of the cut, additional work must be done by either repositioning the workpiece and recutting with laser system 30, or using other tools.

Figure 1C:
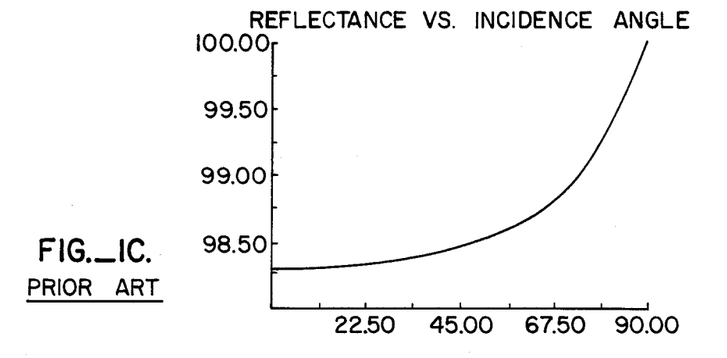
FIG. 1C is a graph illustrating the reflectance aspect of the reflector of FIG. 1A.
Figure 2B:
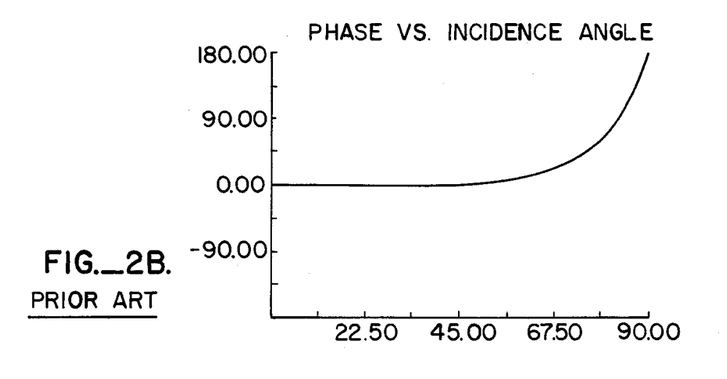
FIG. 2B is a graph illustrating the phase shift aspect of the reflector of FIG. 2A.
Figure 2C:
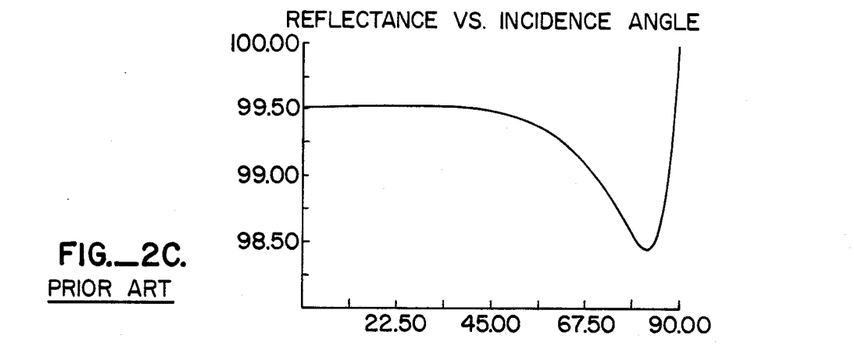
FIG. 2C is a graph illustrating the reflectance aspect of the reflector of FIG. 2A.

As shown in FIG. 2A, another prior art reflector is illustrated, designated 20. Reflector 20 is similar to reflector 12 in that the substrate 22 is provided onto which a highly reflective metallic layer 24 is deposited. Reflector 20 further comprises alternating layers of dielectric material; layers 26A and 28A are materials having low refractive index such as $SiO_2$, ZnS, $ThF_4$, and layers 26B and 28B are materials having high refractive index such as Ge and $TiO_2$. Each of these dielectric layers has an optical thickness of one quarter wave of a laser's wavelength, thus contributing to the nomenclature "quarter wave stack." Although reflector 20 is capable of providing a reflectance higher than that of reflector 12, the thicknesses of its various dielectric layers must be tuned in order to achieve zero phase shift. The reflectance of reflector 12 and reflector 20 are best illustrated in FIGS. 1C and 2C, respectively. Although test data indicate that reflector 20 has a "p" to "s" phase of less than six degrees when the incidence angle is less than 40 degrees, this characteristic was not recognized nor utilized in the prior art since reflector 20 is generally positioned at the conventional angle of 45 degrees. As a practical matter, reflector 20 is not capable of maintaining its high reflectance when the angle of incidence is beyond 45 degrees. As best illustrated in the graph of FIG. 2B, the reflectance capability of reflector 20 quickly deteriorates as the angle of incidence pass beyond 45 degrees.

When system 30 employs a plurality of randomly selected reflectors 20, system 30 may or may not produce a cutting beam having an ellipticity within the acceptable range of 1 to 1.15 System 30 will not always be less than 1.15 because the differential phase shift of each reflector 20 is not zero and when a plurality of reflectors 20 are required, the differential phase shift of system 30 can accumlate and result in an ellipticity that is much greater than 1.15. Thus, a system 30 that employs reflectors 20 may still contain the infirmity of a system 30 that employs reflectors 12.

Figure 4A:
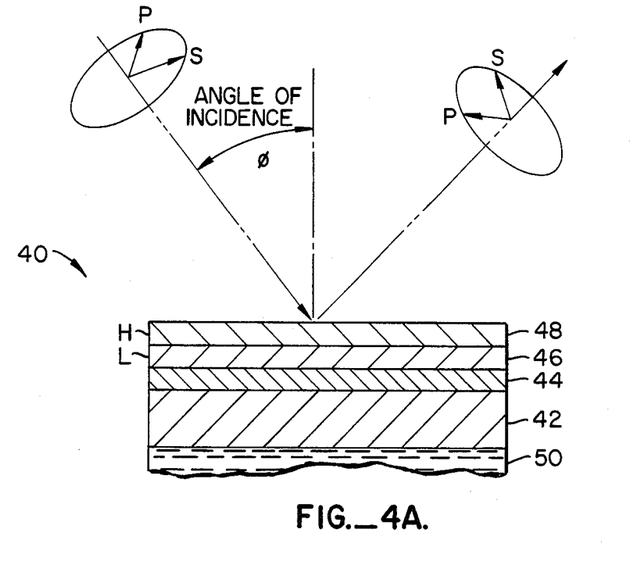
FIG. 4A is an enlarged, cross section and diagrammatical view of a polarization preserving reflector of the present invention.

To alleviate the disadvantages of prior art reflectors 12 and 20, a polarization preserving reflector 40 is provided, as best shown in FIG. 4A. Polarization preserving reflector 40 comprises a substrate 42 onto which a highly reflective layer 44 is deposited. Reflective layer 44 comprises a metallic material such as silver, gold or aluminum. In addition, reflector 40 comprises two thin film optical layers—a low refractive index layer 46 and a high refractive index layer 48. Low refractive index layer 46 comprises a low refractive index dielectric material such as $SiO_2$, ZnS, or $ThF_4$. High refractive index layer 48 comprises a high refractive index dielectric material such as Ge or $TiO_2$. Dielectric layers 46 and 48 in the preferred embodiment are $ThF_4$ and Ge, respectively. It should also be noted that reflector 40 can be made with a plurality of such dielectric layers. In addition, reflector 40 has a cooling body 50 positioned adjacent to substrate 42 so as to dissipate the heat generated by the laser beam impacting on reflector 40.

As best shown in FIG. 4A, the incident beam in the preferred embodiment is a collimated, monochromatic, and circularly polarized laser beam generated by a $CO_2$ laser. The wavelength of the $CO_2$ laser is approximately 10.6 microns. The angle of incidence of the laser beam is selected to be approximately 45 degrees. Circular polarization is best described as two linear, orthogonal polarizations that are 90 degrees out of phase each of which is generally represented by the letters "p" and "s," respectively. Upon reflection by polarization preserving reflector 40, each of the reflected "p" and "s" polarizations has approximately equal amplitude and the phase shift between them is maintained. In essence, the differential phase shift of the "p" and "s" components of the reflected beam is identical to that of the incident beam. The polarization of the reflected beam is, therefore, preserved. Reflector 40 is capable of not only preserving incident circular polarizations but also, all of the other types of incident polarizations such as linear and elliptical.

Figure 4B:
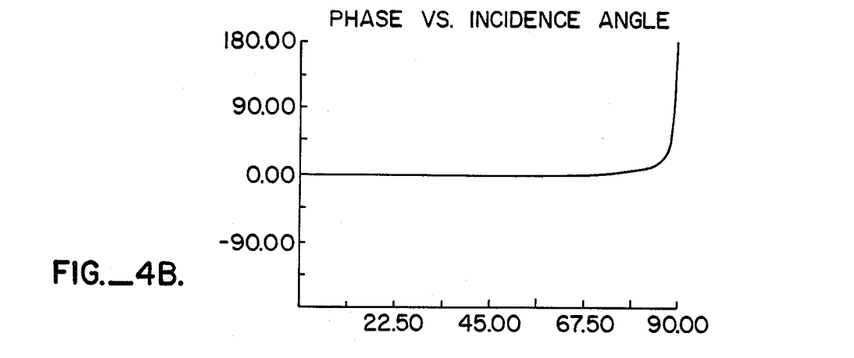
FIG. 4B is a graph illustrating the polarization preserving characteristic of the polarization reflector of FIG. 4A.
Figure 4C:
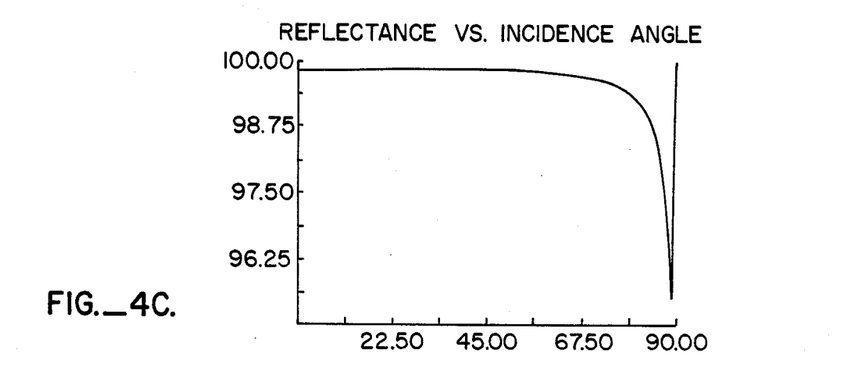
FIG. 4C is a graph illustrating the reflectance characteristic of the polarization preserving reflector of FIG. 4A.

As best shown in FIG. 4B, the differential phase shift upon reflection by reflector 40 is also maintained within ±2.5 degrees for the range of incident angles zero to 75 degrees. This range is compared with the the unrecognized range of zero to 40 degrees for enhanced silver protector 20, as best shown in FIG. 2B. The average reflectance, that is the average of the "p" and "s" reflectances, is greater than 99.5% for the same range of incidence angles, as best shown in FIG. 4C.

To obtain the desired characteristics of reflector 40, the following functional forms are utilized:

$$(R_p, R_s, \Delta) = f(\phi, \lambda, N_j, d_i), i=1, 2; j=0, 1, 2$$

where
- $R_p$ = "p" polarization reflectance of the system,
- $R_s$ = "s" polarization reflectance of the system,
- $\Delta$ = desired relative phase shift between polarizations,
- $\phi$ = angle of incidence of incident beam,
- $\lambda$ = wavelength of the beam,
- $N_j$ = refractive index of either ambient, metallic layer 44, layer 46 or layer 48,
- $d_i$ = thickness of either layer 46 or layer 48.

The above functional relationship is represented by the ratio of the complex amplitude reflection coefficients $R_p$ and $R_s$:

$$\rho = \frac{R_p}{R_s} = \tan(\psi) e^{j\Delta}.$$

In particular, each of the reflection coefficients $R_p$ and $R_s$ may be represented by $$R_\nu = \frac{r_{01\nu} + r_{12\nu}X_1 + r_{01\nu}r_{12\nu}r_{23\nu}X_2 + r_{23\nu}X_1X_2}{1 + r_{01\nu}r_{12\nu}X_1 + r_{12\nu}r_{23\nu}X_2 + r_{01\nu}r_{23\nu}X_1X_2}, \nu = p, s$$

Since $R_p$ and $R_s$ each can also be defined as the product of a magnitude and a phase term, $$R_\nu = |R_\nu| e^{j\delta_\nu}, \delta = p, s$$

where $\delta$ is the absolute phase retardation of the "p" or "s" component. When the magnitude term is squared, the reflectance or the percent of the incident power that is reflected is represented by $$R_\nu = |R_\nu|^2, \nu = p, s$$

The ratio of the p to s complex reflection coeffecients is $$\frac{R_p}{R_s} = \frac{|R_p|}{|R_s|} e^{j(\delta_p - \delta_s)}$$

where $$\Delta = \delta_p - \delta_s.$$

Moreover, $R_p$ and $R_s$ are functions of Fresnel's complex interface reflection coefficients, as given by the following equations:

$$r_{ijp} = \frac{N_j^2 S_i - N_i^2 S_j}{N_j^2 S_i + N_i^2 S_j}, (i,j) = (0,1), (1,2), (2,3)$$

$$r_{ijs} = \frac{S_i - S_j}{S_i + S_j}, (i,j) = (0,1), (1,2), (2,3).$$

In turn, the Fresnel interface coefficients are functions of the complex refractive indices of the dielectric layers and substrates, and the angle of incidence of the light beam so as to produce the following relationships:

$$S_i = (N_i^2 - N_0^2 \sin^2\phi)^{\frac{1}{2}}, i=0,1,2,3$$

$$N_i = n_i - j k_i, i=(0,1,2,3); j=\sqrt{-1}.$$

Further, $R_p$ and $R_s$ are also functions of the film thicknesses $d_i$ and the film periods, as given by the following equations:

$$X_i = e^{-j2\pi \frac{d_i}{D_{\phi i}}}, i = 1,2$$

$$D_{\phi i} = \frac{\lambda}{2}(N_i^2 - N_0^2 \sin^2\phi)^{-1/2}, i = 1,2$$

By taking the ratio of $R_p$ and $R_s$, two ellipsometric parameters are defined where $\tan(\Psi)$ is the ratio of the amplitudes and $\Delta$ is the differential phase shift of the "p" and "s" polarizations upon reflection. Thus, the differential phase shift and the "p" and "s" reflectances are a function of the angle of incidence, wavelength, refractive indices of the ambient, dielectric layers 46 and 48, and substrate 44, and thickness of the layers 44, 46 and 48.

In light of these relationships, the desired "p" and "s" reflectances are unity and the desired differential phase shift is zero. In addition, the refractive indices of either metallic layer 44, layer 46 or layer 48, and the wavelength of the incident beam are known, with the angle of incidence selected to be 45 degrees. The complex refractive index of metallic layer 44, a silver material, is $N_s = 11.8327 - i72.7107$. Low index layer 46 (ThF$_4$) is $N_l = 1.4 - i0.0004$, and high index layer 48 (Ge) layer 48 is $N_h = 4.1 - i0.0007$. The wavelength of the CO$_2$ beam is 10.6 microns. Thus, the only unknown parameters are the thickness of the two dielectric layers. Accordingly, the thickness of the two layers may be varied in order to optimize and achieve the desired parameters of reflectance and differential phase shift. The calculated thickness of low index layer 46 in the preferred embodiment is 2.4858 microns, which corresponds to a quarter wave optical thickness (QWOT) of 13.9204. Similarly, the calculated thickness of high index layer 48 is 0.666 microns, which corresponds to 10.9227 QWOT. With these layer thicknesses, polarization preserving reflector 40 has an average reflectance that is greater than 99.5% and a differential phase shift that is within ±2.5 degrees of zero over the range of incidence angles from zero to 75 degrees. It should be noted here that any combination of layers and materials can be optimized so as to achieve polarization preserving reflection.

Figure 5:
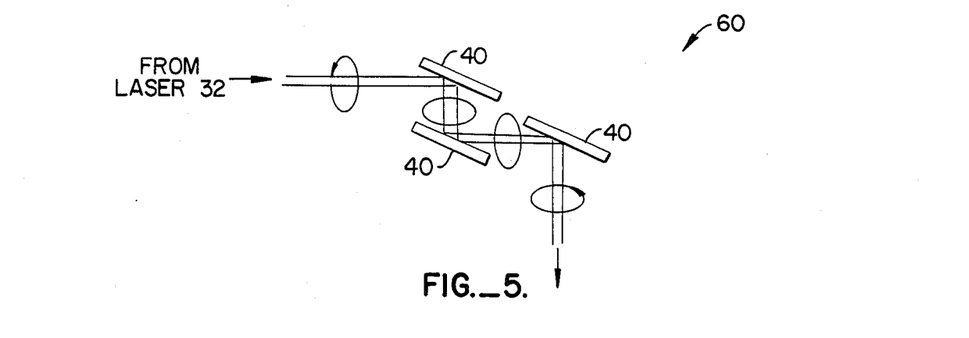
FIG. 5 is a simplified, diagrammatical view of a laser system employing the polarization preserving reflector of FIGS. 4A-4C.

When a plurality of polarization preserving reflectors 40 are placed in a laser system 60, as best shown in a diagrammatical fashion in FIG. 5, the resultant laser beam will maintain the incident circular polarization of the incident beam. Prior art system 30, using reflectors 12 or 20, would produce an energing beam that is significantly deviated from the circular polarization, thereby providing a low quality cut on a workpiece. Using reflectors 40, the ellipticity of the energing beam of system 60 is below the desired upper limit of 1.15. Since system 60 is adapted to emit a high energy beam, i.e., at least 100 watts, each reflector 40 includes cooling body 50 to dissipate the heat generated by the laser beam. Cooling body 50 in the preferred embodiment is a conventional water-cooled device.

Figure 6:
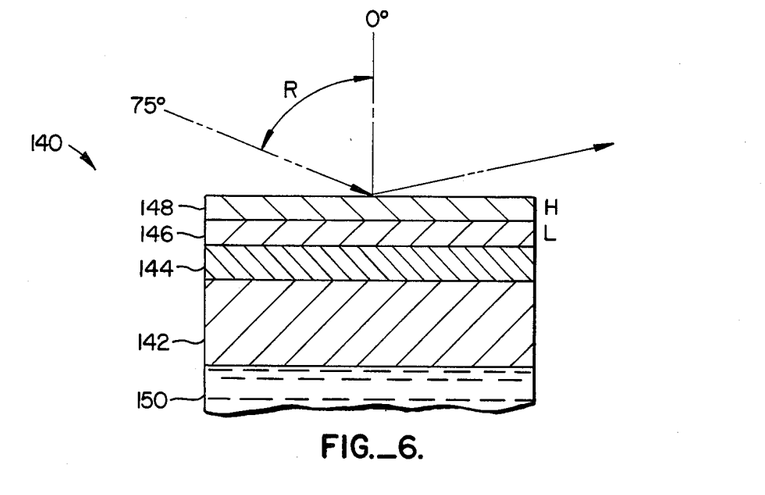
FIG. 6 is an enlarged, cross section and diagrammatical view of an alternative embodiment of the polarization preserving reflector of FIGS. 4A-4C, a polarization preserving reflector that is angle insensitive.

As best shown in FIG. 6, an alternative embodiment to polarization reflector 40 is illustrated. Polarization preserving reflector of the alternative embodiment, designated 140, is capable of performing its polarization preserving function irrespective of the angle of incidence of the laser beam. Since many elements of the alternative embodiment are similar to elements of the preferred embodiment, a numeral "1" is added to the numerals which designate corresponding elements of the preferred embodiment. For example, the substrate in the alternative embodiment is designated 142.

Angle insensitive, polarization preserving reflector 140 comprises a substrate 142 onto which a highly reflective layer 144 is deposited. In addition, a low refractive index dielectric layer 146 and a high refractive index dielectric layer 148 are deposited. Moreover, a cooling body 150 is positioned adjacent to substrate 142. The material of each of the components of reflector 140 corresponds to the material of its counterpart in reflector 40. Utilizing the mathematical equations previously described, the thickness of layers 146 and 148 are selected with the angle of incidence varying between the range of zero to 75 degrees. Thus calculated, reflector 140, with dimensions of its layers 146 and 148 the same as those of reflector 40, is capable of preserving polarization and maintaining high reflectance when the angle of incidence is in the range of zero to 75 degrees, as best shown in FIGS. 4B and 4C. The differential phase shift is maintained within ±2.5 degrees of zero in this incidence range and the average reflectance is maintained at approximately 99.5%.

Figure 7:
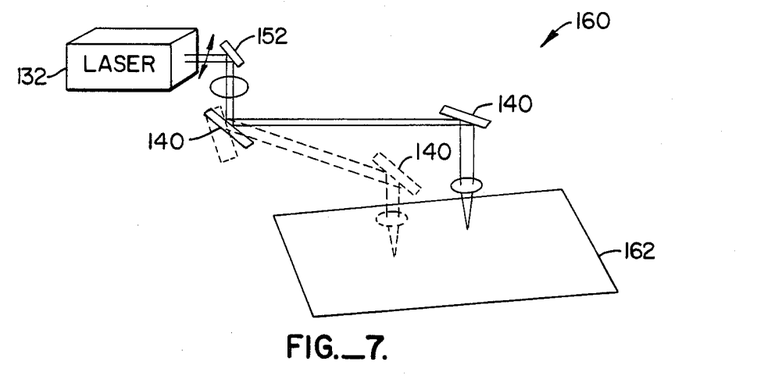
FIG. 7 is a simplified, diagrammmatical view of a laser system employing the angle insensitive, polarization preserving reflector of FIG. 6.

The use of angle insensitive, polarization preserving reflectors 140 are illustrated in FIG. 7. System 160 of FIG. 8 comprises a laser source 132, a conventional quarter wave reflector 152, and a plurality of such reflectors 140. Instead of being confined to use reflectors which must be positioned at angles of 45 degrees, reflectors 140 are positioned at a variety of angles for delivering the emitted laser beam to a workpiece 162. In addition, instead of using eight 45 degree-angled reflectors, e.g., system 30 of FIG. 3 or system 60 of FIG. 5, a lesser number such as two angle insensitive reflectors 140 may be used to produce the identical result. System 160 is also capable of reaping benefits such as less power loss in the delivery system, less number of optical elements to align, and lower costs due to a lesser number of reflectors needed.

Figure 8:
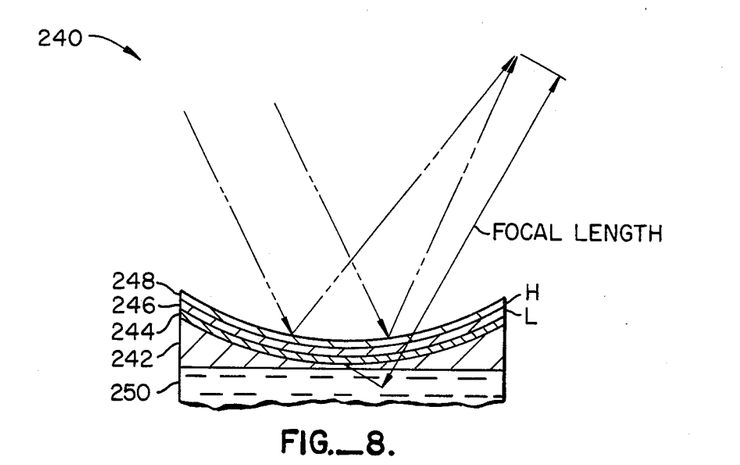
FIG. 8 is a further alternative embodiment of the reflectors of FIGS. 4A-4C and 6, a polarization preserving reflector that is capable of focusing a laser beam.

A further alternative embodiment of the present invention is illustrated in FIG. 8. Polarization preserving reflector 240 is capable of focusing a laser beam. A numeral "2" is added to the numerals which designate corresponding elements of the preferred embodiment. The salient difference between reflector 240 and reflector 40 is the fact that reflector 240 is designed with a curved surface. Toroidal reflector 240 comprises a substrate 242 onto which a highly reflective metallic layer 244 is deposited. In addition, a low refractive index dielectric layer 246 and a high refractive dielectric layer 248 are provided. Moreover, a cooling body 250 is positioned adjacent to substrate 242.

The radius of curvature of reflector 240 is selected such that the focal length of reflector 240 is in a typical range of 2 to 10 inches. The selection of the focal length is well within the knowledge of one skilled in the art. Having a selected curvature, reflector 240 is capable of focusing a laser beam that impinges at a specified fixed angle of incidence.

Figure 9:
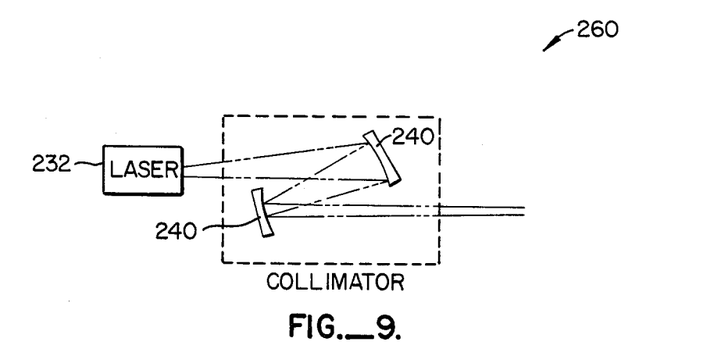
FIG. 9 is a simplified, diagrammatical view of a laser system employing the focusing polarization preserving reflector of FIG. 8.

A use of the toroidal focusing reflector 240 is best illustrated in FIG. 9. System 260 comprises a laser source 232 and two toroidal focusing reflectors 240 such that they function as a collimator. When a laser beam has travelled a certain distance, it tends to diffuse from its collimated state. Collimation is, therefore, required to bring the laser beam back to its collimated and useful state. Collimators for performing such functions are common in the art.

The focusing devices for such prior art collimators, however, are transmissive lenses. The disadvantage of transmissive lens is that the lens material absorbs power from the laser beam, causing the temperature of the center of the lens to increase. This in turn causes the refractive index of the lens to change, thereby changing the focal length. When the focal length of the lens has been changed, the quality of the cut produced by a system such as system 30 of FIG. 2 is not preserved. This effect is commonly known as the "thermal lensing effect." The thermal lensing effect is more acute when higher power laser systems are used, e.g., above 500 watts. An important use of toroidal focusing reflector 240 is to replace the transmissive focusing lens in focusing device 36 of FIG. 3 or any other focusing device such as a focusing device, not shown, in FIG. 7. Toroidal focusing reflector 240, thus, alleviates the disadvantages of the transmissive focusing lens of the prior art.

It will be apparent to those skilled in the arts that various modifications may be made within the spirit of the invention and the scope of the appended claims. For example, toroidal focusing reflector 240 may replace the focusing device 36 of prior art system 30. Or, focusing reflector 240 may substitute one or more reflectors 40 in system 60 of FIG. 5 or reflector 140 of FIG. 7. In essence, focusing reflectors 240 may be used whenever collimation or focusing is required. Moreover, the type of laser used is not restricted to the $CO_2$, but rather, any type with various wavelengths which are available. Further, polarization preserving reflectors 40, 140 and 240 are, naturally, capable of preserving the polarization of the incident beam when the incident polarization is of any type. Last, the reflectance of polarization preserving reflectors 40, 140 and 240 can be improved by adding one or two more pairs of high and low index dielectric layers 46, 48 on top of the designs of the above-described embodiments.

We claim:

1. A laser system for machining a work piece comprising:
   a laser source for generating a beam of linearly polarized radiation;
   means for focusing the radiation onto the surface of a work piece; and
   delivery means for transmitting the radiation beam from the laser source to the focusing means, said delivery means including quarter wave optical element for converting the linearly polarized beam into a circularly polarized beam, said delivery means further including at least one polarization preserving reflecting element having an average reflectance of at least 99.5 percent of the incoming radiation beam, said polarization preserving reflecting element for maintaining the polarization state of the incoming radiation beam through varying angles of incidence such that the phase shift induced by said polarization preserving reflecting element is less than 2.5 degrees from zero for angles of incidence between zero and 75 degrees whereby the polarization state of the beam delivered to the focusing means will be substantially circular thereby preserving the quality of the machining operation.

2. A laser system as recited in claim 1 wherein the ellipticity of the radiation beam delivered to the focusing means by the delivery means is less than 1.15.

3. A laser sytem as recited in claim 1 wherein the configuration of said delivery means is arranged such that the radiation beam strikes said quarter wave optical element prior to reaching said polarization preserving reflecting element.

4. A laser system as recited in claim 1 wherein said polarization preserving reflecting element has a radius of curvature for focusing the radiation beam.

5. A laser system as recited in claim 1 wherein said delivery system includes a pair of polarization preserving reflecting elements each having a radius of curvature, said pair of reflecting elements for collimating the radiation beam.

6. A laser system as recited in claim 1 wherein said focusing means is defined by a polarization preserving reflecting element having a radius of curvature for focusing the radiation beam onto the work piece.

7. A laser system as recited in claim 1 wherein said laser source is defined by a carbon dioxide laser generating a beam of radiation having a power of at least 100 watts.

8. A laser system as recited in claim 1 wherein said polarization preserving reflecting element comprises:
   a substrate;
   a highly reflective layer positioned adjacent to said substrate; and
   at least two thin film optical layers one of which is positioned adjacent to said highly reflective layer and having a low refractive index and with the other layer having a high refractive index.

9. A laser system as recited in claim 8 wherein said thin film optical layers of said polarization preserving optical element are formed from dielectric materials.

10. A laser system as recited in claim 9 wherein the thin film optical layer having a low refractive index is formed from a material selected from the group consisting of $SiO_2$, ZnS and $ThF_4$.

11. A laser system as recited in claim 9 wherein the thin film optical layer having a high refractive index is formed from a material selected from the group consisting of Ge and $TiO_2$.

12. A laser system as recited in claim 9 wherein said highly reflective layer of said polarization preserving optical element is formed from a material selected from the group consisting of silver gold and aluminum.

13. A laser system as recited in claim 8 wherein said polarization preserving optical element further includes a cooling body positioned adjacent said substrate to dissiptate heat generated by said radiation beam.

* * * * *